(No Model.)
L. SWEET.
VEHICLE SHAFT SUPPORT.
No. 392,295.  Patented Nov. 6, 1888.
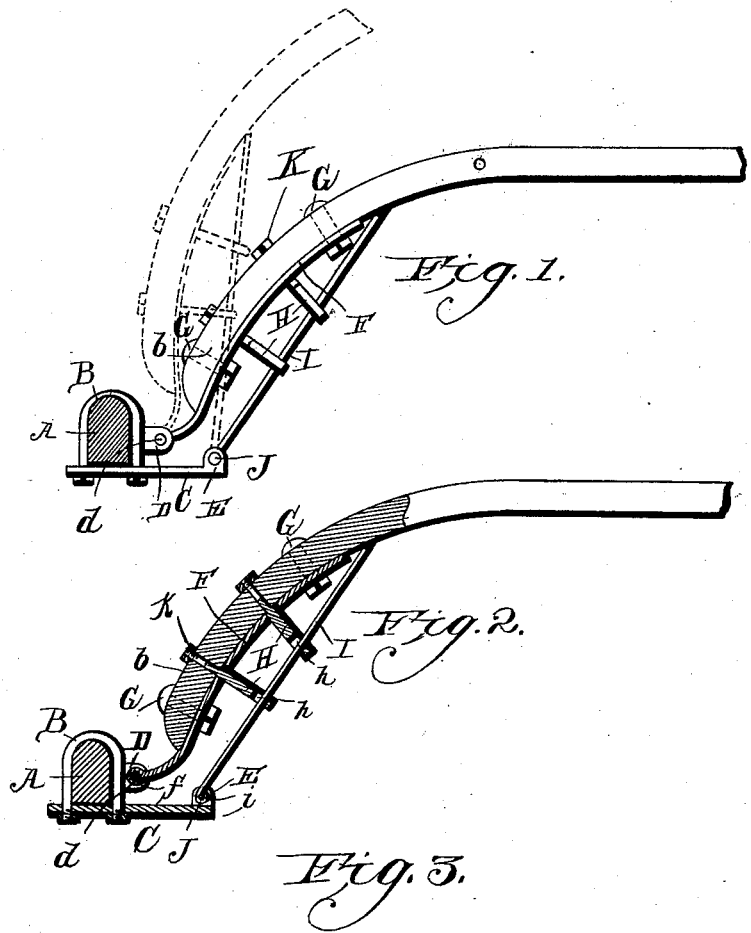
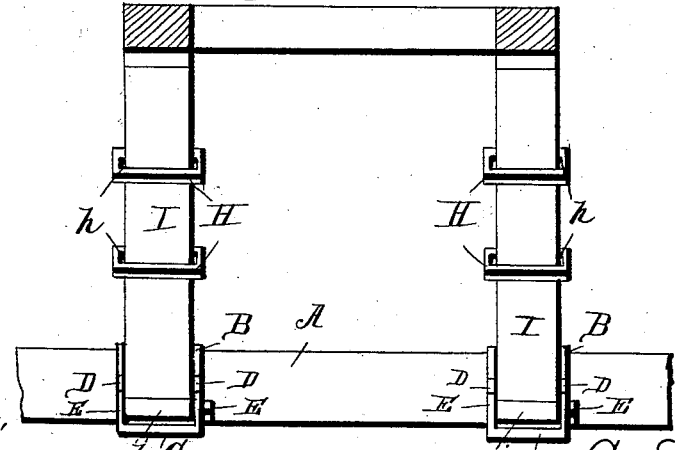
Witnesses,
Henry G. Dieterich
R. J. Marshall Jr.
Inventor,
L. Sweet
By his Attorneys

UNITED STATES PATENT OFFICE.

LARNTINE SWEET, OF LOAMI, ILLINOIS.

VEHICLE-SHAFT SUPPORT.

SPECIFICATION forming part of Letters Patent No. 392,295, dated November 6, 1888.

Application filed June 22, 1888. Serial No. 277,919. (No model.)

*To all whom it may concern:*

Be it known that I, LARNTINE SWEET, a citizen of the United States, residing at Loami, in the county of Sangamon and State of Illinois, have invented new and useful Improvements in Shaft-Supporters, of which the following is a specification.

The invention relates to improvements in thills or shaft-supporters; and it consists in the construction and novel combination of parts, hereinafter described, illustrated in the accompanying drawings, and pointed out in the claims hereto appended.

In the drawings, Figure 1 is a side view of the thills and front axle of a vehicle having the invention attached. Fig. 2 is a longitudinal section through one of the thills and the attachments of the same. Fig. 3 is a front view of the spring-supports and the attachments thereof, shown enlarged.

Referring to the drawings by letter, A designates the front axle of a vehicle having the attached thill-clips B, connecting the thills $b$ thereto in the ordinary manner. The said thill-clips have their clip-plates provided with an extension, C, in the front of the axle, to which it is attached, and the said clips are provided with perforated ears D and E, respectively, the former of which stands from the clip and the latter from the end of the extension. The pair of ears D have journaled in their perforations the short shaft $d$, upon which the transverse eye $f$ of the thill-iron F is seated, so that the said eye can turn thereon. The thill-iron passes below the butt of the corresponding thill, and is secured to the lower surface thereof by bolts or rivets G, as shown.

H H are metal loops depending from each thill, with their shanks threaded and engaged in threaded openings in the corresponding thills and in the thill-iron F. The eyes $h$ of said loops are preferably rectangular and stand transversely.

I I are spring-supports, having their rear ends formed into transverse eyes $i$, which surround and turn on the short transverse shafts J, journaled in the perforations of the ears E. The said supports extend frontward from said eyes $i$, and their free ends bear under and against the corresponding thills, their middle portions passing through the eyes $h$ of the loops H, which depend below the thills, as shown and described.

The eyes $h$ of the loops H hold the spring-supports up against the thills, the free ends of said supports bearing against the under surfaces of the thills, which travel back and forth thereover as they are raised and lowered.

The bearing-loops H have their shanks projecting above the corresponding thills and engaged to nuts K thereabove, by means of which nuts the said loops may be adjusted higher or lower.

The normal position of the parts is that shown in Fig. 2 and in full lines in Fig. 1, in which position a horse can be harnessed to the shafts. When the vehicle is not in use, the shafts or thills are raised to the position shown in dotted lines in Fig. 1, when the tension of the springs will serve to hold them in said raised position. If desired, the nuts K can be turned up after the thills are raised, so as to draw the loops H toward the same, thereby increasing the tension of the springs, so as to more effectively hold the shafts in their raised position.

Having described my invention, I claim—

1. The combination of the axle, the clips secured thereto, having the ears D on their front sides, the clip-plates extended forward from the axle, having the ears E at their front ends, the thills pivoted between the ears D, and the springs pivoted between the ears E and bearing against the under side of the thills, as set forth.

2. The combination of the axle, the clips secured thereto, having the ears D on their front sides, the clip-plates extended forward from the axle and having the ears E at their front ends, the thills pivoted between the ears D, the springs pivoted between the ears E and bearing against the under sides of the thills, the loops having transverse eyes engaging the springs, and having threaded shanks passing through thills, and nuts turning on said shanks against the upper sides of the thills, as set forth.

In testimony that I claim the foregoing as my own I have hereto affixed my signature in presence of two witnesses.

LARNTINE SWEET.

Witnesses:
GEORGE WASHINGTON KINNY,
H. C. FOSTER.